Jan. 22, 1924.

H. O. RUSSELL ET AL 1,481,391

GROUND SPEED INDICATOR

Filed April 18, 1922

Inventor
Herbert O Russell
Charles Leigh Paulus

By Robert H. Young  Attorney

Patented Jan. 22, 1924.

1,481,391

UNITED STATES PATENT OFFICE.

HERBERT O. RUSSELL, OF DETROIT, MICHIGAN, AND CHARLES LEIGH PAULUS, OF DAYTON, OHIO.

GROUND-SPEED INDICATOR.

Application filed April 18, 1922. Serial No. 555,413.

*To all whom it may concern:*

Be it known that we, HERBERT O. RUSSELL and CHARLES LEIGH PAULUS, citizens of the United States, residing respectively, at Detroit and Dayton, in the counties of Wayne and Montgomery and States of Michigan and Ohio, have invented certain new and useful Improvements in Ground-Speed Indicators, of which the following is a specification.

This invention relates to ground speed indicator or device for determining the actual speed of aircraft and the direction of that speed in reference to the ground.

With the above and other objects in view, the invention consists in the novel construction, combination and arrangement herein fully described, illustrated and claimed.

Figure 1:
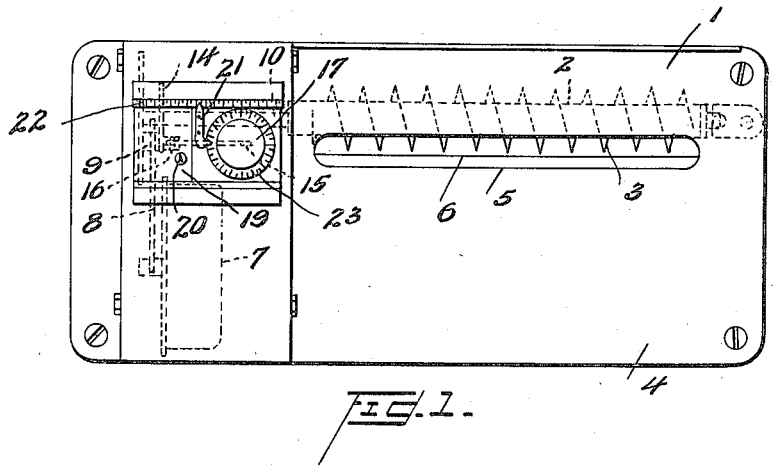
Figure 1 is a plan view of the ground speed indicator, showing the operating mechanism in dotted lines.

The ground speed indicator, in the illustrated embodiment thereof, comprises a housing 1 in which is journaled a rotary shaft 2 having a continuous spiral flight or thread 3. The top plate or cover 4 of the housing is formed with an elongated observation orifice 5 extending parallel to the axis of the shaft 2 and adapted to expose the threads 3 as will be apparent in Figure 1. Extending in parallel relation to the shaft 2 and approximately coincident with the outer edges of the threads 3 is a line flight wire 6 which, when the instrument is in use, is brought into parallelism with the line of flight of the aircraft.

Figure 2:
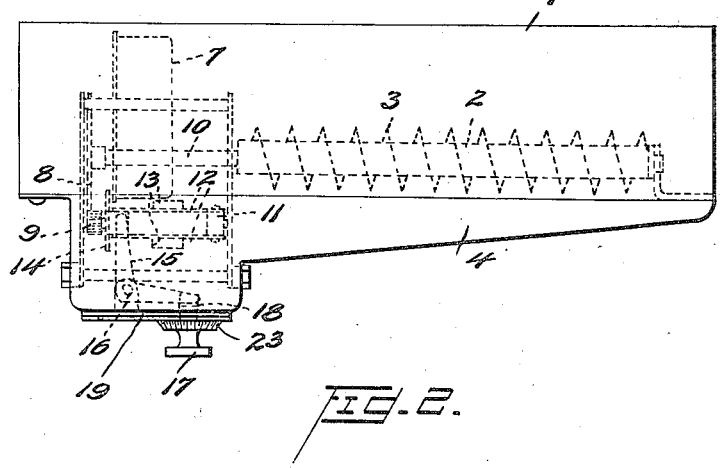
Figure 2 is a side elevation of the same.

The mechanism for driving the shaft 2 and controlling the speed of rotation thereof embodies a motor 7 which may consist of a simple spring motor connected by means of gears 8 and 9 to an extension 10 of the shaft 2 as indicated in Figure 2. The speed of the shaft 2 is controlled by means of a governor mechanism 11 embodying oppositely arranged springs 12 having centrally located weights 13. At one end the springs 12 are connected to a movable disc 14 which, as weights 13 move toward and away from each other, gets a corresponding movement. Bearing against the disc is one arm of a friction member 15 which is shown in the form of a lever of bell crank formation the same being mounted on a pivot 16 in the housing. The member 15 is capable of being shifted and adjusted by means of the knob 17 of an adjusting screw 18. In this way more or less friction or resistance to the rotation of the disc 14 may be applied. The pivot 16 which forms the fulcrum of the lever or member 15 is carried by a slidable plate 19 adjustable by means of a screw 20. The plate 19 carries a pointer or indicator 21 movable along a graduated scale 22. By means of the knob 17 the rotation of the disc 14 may be increased or decreased. The scale 22 is used to set the mechanism in accordance with the altitude of the aircraft. Thus the altitude correction is properly introduced into the ground speed.

In the use of the ground speed indicator, the axis of the shaft 2 and the wire 3 are brought into the line of flight of the aircraft. When it is desired to read the ground speed, any distinct fixed object on the ground is observed through the orifice 5 and the housing is turned about a vertical axis perpendicular to the ground until the movement of the object on the ground is in a line parallel to the wire 6. The altitude is then read from a suitable altimeter and the plate 19 is set until the proper altitude is noted on the scale 22. The motor 7 is then started and the knob 17 turned until the movement of the object on the ground exactly synchronizes with the movement of the threads of the shaft 2. When this synchronism is accomplished the ground speed may be at once read from the dial 23.

What we claim is:

1. In a ground speed indicator, a rotary threaded shaft, a housing therefor having an observation orifice through which the movement of the threads of said shaft is visible, a motor for driving said shaft, means for regulating the speed of said shaft in synchronism with a fixed object on the ground, and means controlled by said regulating means to indicate the ground speed in miles per hour.

2. In a ground speed indicator, a rotary threaded shaft, a housing therefor having an observation orifice through which the movement of the threads of said shaft is visible, a line of flight wire extending parallel to the axis of said shaft and also visible through said orifice, a motor for driving said shaft, means for regulating the speed of said shaft in synchronism with a fixed object on the ground, and means controlled by said regulating means to indicate the ground speed in miles per hour.

3. In a ground speed indicator, a rotary threaded shaft, a housing therefor having an observation orifice through which the movement of the threads of said shaft is visible, and a motor for driving said shaft, means for regulating the speed of said shaft in synchronism with a fixed object on the ground, an altitude compensating mechanism cooperating with said speed regulating means, and means controlled by said regulating means to indicate the ground speed in miles per hour.

4. In a ground speed indicator, a rotary threaded shaft, a housing therefor having an observation orifice through which the movement of the threads of said shaft is visible, a motor for driving said shaft, means including governor mechanism for regulating the speed of said shaft in synchronism with a fixed object on the ground, and means controlled by said regulating means to indicate the ground speed in miles per hour.

5. In a ground speed indicator, a rotary threaded shaft, a housing therefor having an observation orifice through which the movement of the threads of said shaft is visible, a motor for driving said shaft, means including friction controlled governor mechanism for regulating the speed of said shaft in synchronism with a fixed object on the ground, and means controlled by said regulating means to indicate the ground speed in miles per hour.

HERBERT O. RUSSELL.
CHARLES LEIGH PAULUS.